(12) United States Patent
Kannery et al.

(10) Patent No.: US 12,541,521 B1
(45) Date of Patent: Feb. 3, 2026

(54) TELEMETRY DATA TABLE CREATION AND MERGING IN TIME SERIES FOR OPTIMAL DATA STORAGE IN CLUSTER NETWORKS

(71) Applicant: Dell Products L.P., Round Rock, TX (US)

(72) Inventors: Supriya Kannery, Bengaluru (IN); Rajat Badola, Bengaluru (IN); Philip Shilane, Newtown, PA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/790,281

(22) Filed: Jul. 31, 2024

(51) Int. Cl.
*G06F 16/2455* (2019.01)
*G06F 11/14* (2006.01)
*G06F 16/22* (2019.01)
*G06F 16/25* (2019.01)

(52) U.S. Cl.
CPC .... *G06F 16/24568* (2019.01); *G06F 11/1453* (2013.01); *G06F 16/2282* (2019.01); *G06F 16/24552* (2019.01); *G06F 16/254* (2019.01); *G06F 2201/80* (2013.01)

(58) Field of Classification Search
CPC ........... G06F 16/24568; G06F 11/1453; G06F 16/2282; G06F 16/24552; G06F 16/254; G06F 2201/80
See application file for complete search history.

(56) References Cited

U.S. PATENT DOCUMENTS

| 2020/0348973 | A1* | 11/2020 | Kutch | ..................... H04L 43/08 |
| 2023/0244475 | A1 | 8/2023 | Holowaty | |
| 2023/0300218 | A1 | 9/2023 | Karthikeyan | |
| 2023/0333876 | A1 | 10/2023 | Parthasarathy | |
| 2023/0393547 | A1 | 12/2023 | Leroy | |
| 2024/0235970 | A1* | 7/2024 | Sandhaus | ............. H04L 43/028 |
| 2024/0403137 | A1 | 12/2024 | Rao | |

* cited by examiner

*Primary Examiner* — Tyler J Torgrimson
(74) *Attorney, Agent, or Firm* — Staniford Tomita LLP

(57) ABSTRACT

A telemetry processing system in a cluster network collecting streaming telemetry data from a plurality of telemetry producer pods. Processes improve extraction of telemetry data from a cluster network by collating streaming telemetry data received from each pod as a resource of the network, wherein a defined epoch delineates the streaming data into a plurality of metric datasets. Each dataset is stored in a database table created for the epoch in a respective cache created in a telemetry pipeline for each resource. The cached data is merged for a specific resource for the epoch in a merged database table that combines metric datasets per epoch to remove duplicative information created by the plurality of metric datasets and facilitate more efficient searching and extraction of the streaming telemetry data.

19 Claims, 8 Drawing Sheets

400

| CONSUMER | SAMPLE DATASET CONSUMED | PURPOSE |
|---|---|---|
| Storage Users | Alerts, Summary, Security State | Generate daily alert summary to cover any missed asynch alert |
| GUI | Performance, Topology | GUI displays topology and performance details in real time |
| Internal Pods | Feature details | Internal services consume system performance info to adjust resources |
| Storage Vendor | License, capacity information | Storage vendor enforces business terms |

FIG. 4

702 Replication Compression Information in Timeseries DB with Epoch in microseconds

| epoch (ms) | host | repl_conn_host | repl_pre compression |
|---|---|---|---|
| 1706707758000000 | Repl-be-dd01 | DD01.hq.pvg.eu | 9871408576 |

FIG. 7A

704 Replication Network Information in Timeseries DB with Epoch in microseconds

| epoch (ms) | host | repl_conn_host | repl_network |
|---|---|---|---|
| 1706707758000005 | Repl-be-dd01 | 559468616 | 559468616 |

FIG. 7B

706 Merged Information Stored in Timeseries DB with Epoch in seconds

| epoch (s) | host | repl_conn_host | repl_pre compression | repl_network |
|---|---|---|---|---|
| 1706707758 | Repl-be-dd01 | 559468616 | 9871408576 | 559468616 |

FIG. 7C

TELEMETRY DATA TABLE CREATION AND MERGING IN TIME SERIES FOR OPTIMAL DATA STORAGE IN CLUSTER NETWORKS

TECHNICAL FIELD

Embodiments are directed to distributed networks, and more specifically to providing telemetry data management for optimal data storage.

BACKGROUND

A distributed (or cluster) network runs a filesystem in which data is spread across multiple storage devices as may be provided in a cluster of nodes. Cluster networks (or cluster systems) represent a scale-out solution to single node systems by providing networked computers that work together so that they essentially form a single system. Each computer forms a node in the system and runs its own instance of an operating system. The cluster itself has each node set to perform the same task that is controlled and scheduled by software. In this type of network, the file system is shared by being simultaneously mounted on multiple servers. This type of distributed filesystem can present a global namespace to clients (nodes) in a cluster accessing the data so that files appear to be in the same central location. They are typically very large and may contain many hundreds of thousands or even many millions of files, as well as services (applications) that use and produce data.

The Santorini filesystem represents a type of cluster system that stores the file system metadata on a distributed key value store and the file data on object store. The file/namespace metadata can be accessed by any front end node, and any file can be opened for read/write operations by any front-end node.

Because of their extensive scale and complex component features, cluster systems are typically provided by vendors and installed for use by customers (users). Proper system administration requires the collection and transmission of relevant data to users from applications, nodes, and product vendors within the system. Such data is referred to as "telemetry" data and includes information about the running system that is generated periodically and that should be stored and transferred to the various clients as needed.

In present streaming telemetry applications, every metric data stream is stored as a separate table. Due to this, different metric streams related to the same resource can create multiple tables, thus making the data extraction complicated. For example, in an open telemetry pipeline, two separate metric streams are created for replication pre-compression and replication network for the replication resource. To store this data, two separate tables are created. One table contains information about the replication precompression, while the other table stores details about the replication network. This results in proliferation of tables and makes database querying very difficult for systems with excessive numbers of tables.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and EMC are trademarks of Dell Technologies, Inc.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 4 is a table that lists some example telemetry datasets and consumers, under some embodiments.

FIGS. 7A, 7B, and 7C illustrate an example of a two tables merged to form a stored table, under an example embodiment.

DETAILED DESCRIPTION

Figure 1:
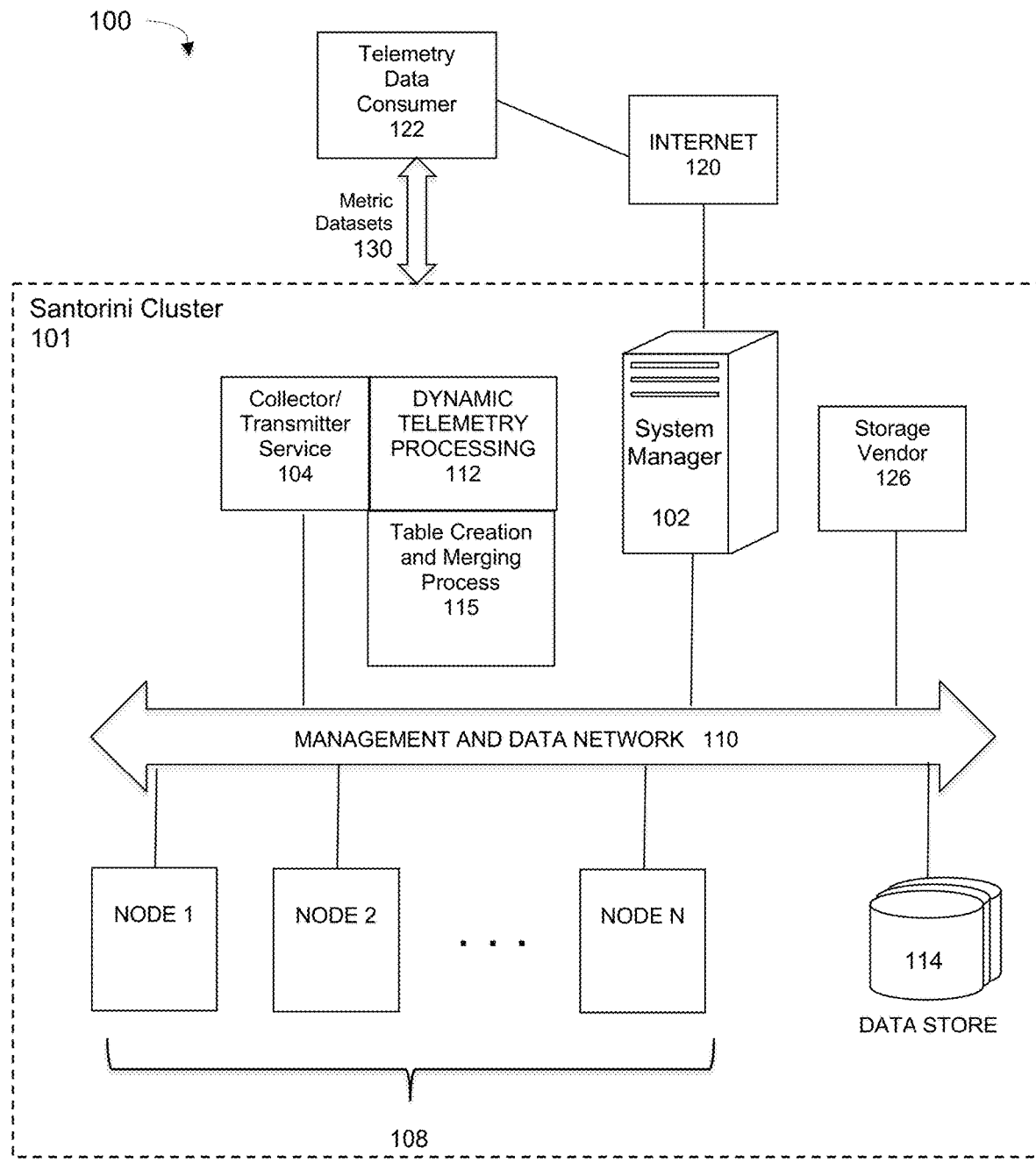
FIG. 1 is a block diagram illustrating a distributed system implementing flexible telemetry processing for cluster networks, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information.

Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments are directed to a processing components for features implementing telemetry data process for cluster network filesystems (e.g., Santorini) for providing users with a flexible system environment where they can dynamically subscribe for different telemetry metrics through preferred transports.

FIG. 1 is a block diagram illustrating a distributed system implementing flexible telemetry processing for cluster networks, under some embodiments. System 100 comprises a large-scale network that includes a cluster network 101 having a number of different devices, such as server or client computers 102, nodes 108, storage devices 114, and other similar devices or computing resources. Other networks may be included in system 100 including local area network (LAN) or cloud networks, and virtual machine (VM) storage or VM clusters. These devices and network resources may be connected to a central network, such as a data and management network 110 that itself may contain a number of different computing resources (e.g., computers, interface devices, and so on). FIG. 1 is intended to be an example of a representative system implementing a distributed computing system under some embodiments, and many other topographies and combinations of network elements are also possible.

A distributed system 101 (also referred to as a cluster or clustered system) typically consists of various components (and processes) that run in different computer systems (also called nodes) that are connected to each other. These components communicate with each other over the network via messages and based on the message content, they perform certain acts like reading data from the disk into memory, writing data stored in memory to the disk, perform some computation (CPU), sending another network message to the same or a different set of components and so on. These acts, also called component actions, when executed in time order (by the associated component) in a distributed system would constitute a distributed operation.

A distributed system may comprise any practical number of compute nodes 108. For system 100, n nodes 108 denoted Node 1 to Node N are coupled to each other and a connection manager 102 through network 110. The connection manager can control automatic failover for high-availability clusters, monitor client connections and direct requests to appropriate servers, act as a proxy, prioritize connections, and other similar tasks.

In an embodiment, cluster network 101 may be implemented as a Santorini cluster that supports applications such as a data backup management application that coordinates or manages the backup of data from one or more data sources, such as other servers/clients to storage devices, such as network storage 114 and/or virtual storage devices, or other data centers. The data generated or sourced by system 100 may be stored in any number of persistent storage locations and devices, such as local client or server storage. The storage devices represent protection storage devices that serve to protect the system data through applications 104, such as a backup process that facilitates the backup of this data to the storage devices of the network, such as network storage 114, which may at least be partially implemented through storage device arrays, such as RAID (redundant array of independent disks) components. The data backup system may comprise a Data Domain system, in which case the Santorini network 101 supports various related filesystem and data managers, such as PPDM, as well as services such as ObjectScale and other services.

In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays for use by a backup server, such as a server that may be running Networker or Avamar data protection software backing up to Data Domain protection storage, such as provided by Dell Technologies, Inc.

Cluster network 101 includes a network 110 and also provides connectivity to other systems and components, such Internet 120 connectivity. The networks may be implemented using protocols such as Transmission Control Protocol (TCP) and/or Internet Protocol (IP), well known in the relevant arts. In a cloud computing environment, the applications, servers and data are maintained and provided through a centralized cloud computing platform.

As shown in FIG. 1, network 101 includes a collector service 104 and dynamic telemetry processing component 112 that is executed by the system to manage the telemetry architecture for users/customers of the system. Process 112 may be a process executed by a specialized node as a specially configured management or control node in system 100. Alternatively, it may be executed as a server process, such as by server 102 or any other server or client computer in the system. The telemetry management process 112 works with the other components of the distributed system and may use certain services or agents that run on each compute node 108 in the distributed system, such as may be implemented as a daemon process running in each node. As generally understood, a daemon is a computer program that runs as a background process, rather than being under the direct control of an interactive user.

As shown in FIG. 1, overall system 100 includes a storage system operated by a storage vendor 126 for protection of data of applications, operating systems, or resources of the cluster network 101. Such a vendor may be called upon to resolve issues or provide fixes to problems encountered by users of these products. In an embodiment, telemetry information 130 is transmitted between the vendor and telemetry data consumers 122, such as over the Internet 120 or over a local network link. In general, the telemetry can be sent to many destinations for use or "consumption" by many different types of consumers. One consumer might be a product customers or system users for their own management purposes. Another consumer might be internal processes that analyze telemetry and sometimes respond to adjust the system or send alerts to the vendor. The vendor itself may also be a consumer. Different types of telemetry can have different destinations, and some telemetry can go to multiple destinations.

Some consumers (e.g., vendors, system admins, etc.) may perform analysis, debugging, or modifications in the form of bug fixes, patches, revisions, etc., that the user can then install or execute in the cluster. In an embodiment, certain debugging tools may be provided in a node to help the vendor analyze and process the telemetry data. In general, the term "consumer" refers to any entity that receives the telemetry data for some use, and may include a user, subscriber, customer, and so on, of system data and resources. The telemetry data may be made available as part of any service, such as on a complementary basis or for a fee by a service provider by contract or subscription.

Figure 2:
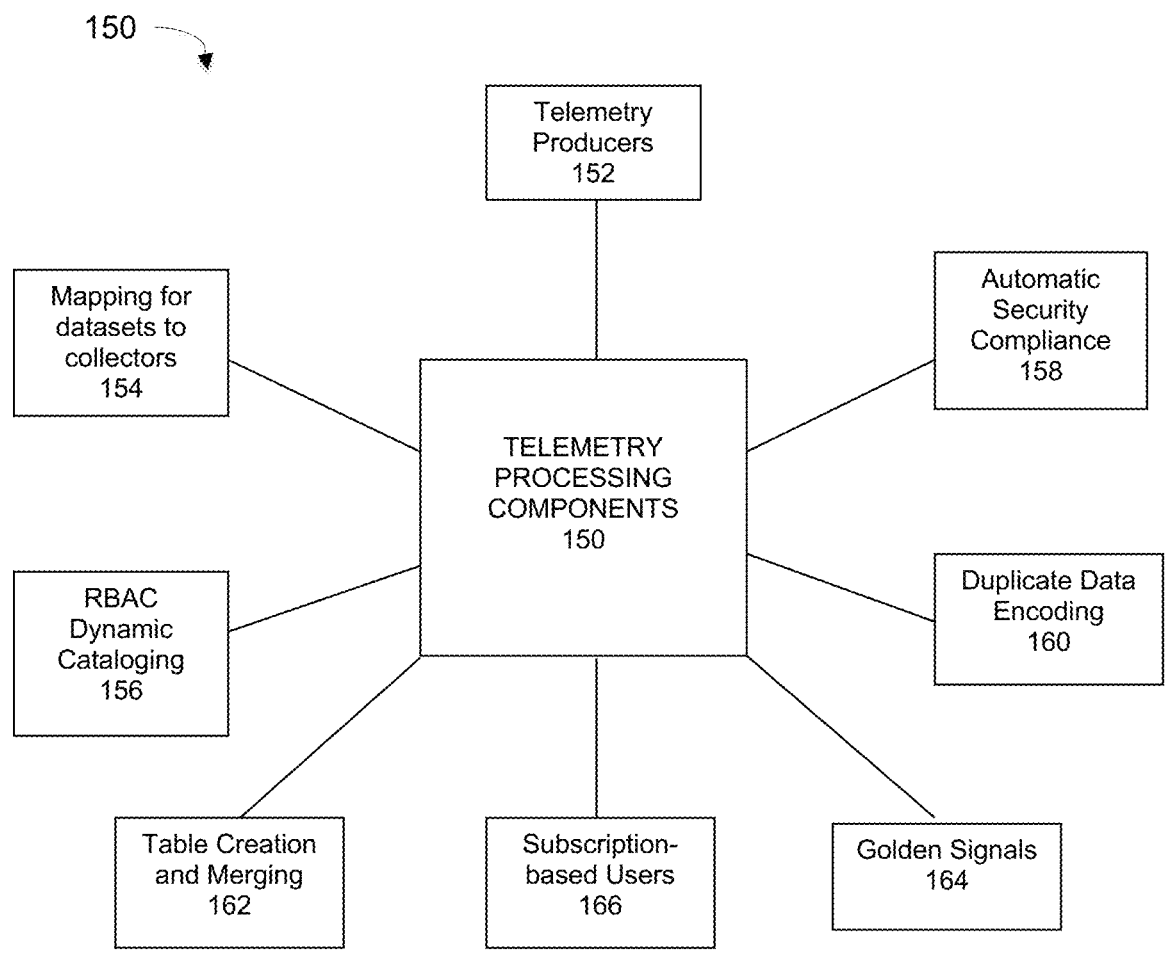
FIG. 2 is a diagram illustrating telemetry processing features for the system of FIG. 1, under some embodiments.

FIG. 2 is a diagram illustrating example telemetry service features for the system of FIG. 1. As shown in FIG. 2, the Santorini cluster 101 of FIG. 1 contains several different components 150 to provide telemetry services to the cluster as it performs its tasks of supporting applications in the system. The components of FIG. 2 allow services and producers to push telemetry to a centralized data store. Telemetry collectors push consistent metrics to "subscribers," which can be varied entities, such as graphical user interfaces (GUI), nodes (pods), or other processes internal or external to a product.

In system 150, telemetry producers 152 dynamically register to add new telemetry metrics. A subscription-based model is used to allow dynamic registrations from subscribers/users 166. The producers may be allowed access through role-based access control (RBAC) protocols. In an embodiment, system 150 may implement an open telemetry system (OTEL) that is opaque regarding transport of data to the subscribers.

The system allows dynamic frequency requests through a method to map data sets to collectors to optimize data collection and sharing, 154. It also provides RBAC-based dynamic cataloging and RBAC-based telemetry collection 156. Currently, catalogs do not show user based entries, and internal and external processes are not allowed to subscribe for different datasets. Process 156 remedies this shortcoming.

System 150 also includes automatic security compliance checks 158 for metric data during data collection, 158. Such compliance checks can be tunable with defined parameters and rules.

Optimization features can include encoding duplicate data values to optimize network bandwidth, 160, and other similar optimizations. For example, system 150 further includes a process for telemetry table creation and merging in time series for optimal data storage, 162. For sustainability, the system may enforce golden signals data collection, 164.

Details of these functional components are provided in greater detail below. The functions illustrated in FIG. 2 are just some examples of possible functions, and embodiments are not so limited. Additional or different functions may also be used.

In an embodiment, cluster network 101 providing the features of system 150 implements containerization technology through a Kubernetes implementation. A container is a virtualized computing environment to run an application program as a service or microservice, and are lightweight, portable data constructs that are decoupled from the underlying infrastructure. Applications are run by containers as microservices with the container orchestration service facilitating scaling and failover. For example, the container orchestration service can restart containers that fail, replace containers, kill containers that fail to respond to health checks, and will withhold advertising them to clients until they are ready to serve.

In an embodiment, system 100 uses Kubernetes as an orchestration framework for clustering the nodes 1 to N in FIG. 1. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software to place less strain on the overall resources available. Containerization technology involves encapsulating an application in a container with its own operating environment, and the well-established Docker program deploys containers as portable, self-sufficient structures that can run on everything from physical computers to VMs, bare-metal servers, cloud clusters, and so on. The Kubernetes system manages containerized applications in a clustered environment to help manage related, distributed components across varied infrastructures. Certain applications, such as multi-sharded databases running in a Kubernetes cluster, spread data over many volumes that are accessed by multiple cluster nodes in parallel.

In Kubernetes, a pod is the smallest deployable data unit that can be created and managed. A pod is a group of one or more containers, with shared storage and resource requirements. Pods are generally ephemeral entities, and when created, are scheduled to run on a node in the cluster. The pod remains on that node until the pod finishes execution.

In an embodiment, the dynamic telemetry process 112 is used in a clustered network that implements Kubernetes clusters. One such example network is the Santorini system or architecture, though other similar systems are also possible.

Such a system can be used to implement a Data Domain (deduplication backup) process that uses object storage (e.g., Dell ObjectScale), Kubernetes, and different types of storage media, such as HDD, Flash memory, SSD memory, and so on. In an embodiment, a PPDM (PowerProtect Data Manager) microservices layer builds on the Data Domain system to provide data protection capabilities for VM image backups and Kubernetes workloads. Santorini exposes a global namespace that is a union of all namespaces in all domains.

Figure 3:
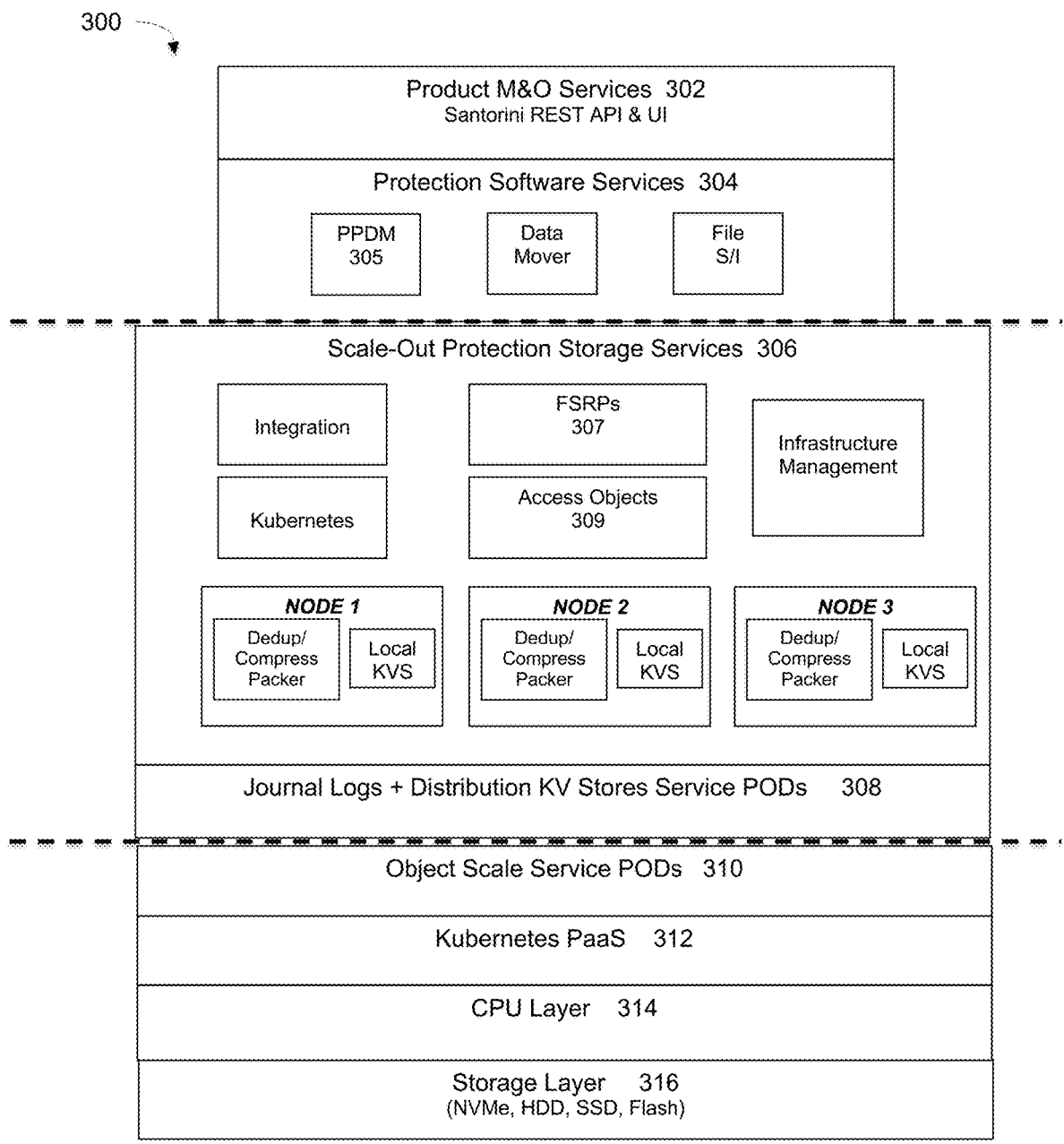
FIG. 3 illustrates an example of some services related to the data path running in Santorini cluster network, under some embodiments.

FIG. 3 illustrates an example of some services related to the data path running in Santorini cluster network, under some embodiments. As shown in diagram 300, a product services layer 302 provides the necessary REST APIs and user interface utilities. The API server implements a RESTful interface, allowing many different tools and libraries can readily communicate with it. A client called kubecfg is packaged along with the server-side tools and can be used from a local computer to interact with the Kubernetes cluster.

Below layer 302, the protection software services layer 304 includes a data manager (e.g., Power Protect Data Manager, PPDM) component 305 that provides backup software functionality. Within the scale-out protection storage services layer 306, the File System Redirection Proxy (FSRP) service 307 redirects file operations in a consistent manner based on the hash of a file handle, path, or other properties to instance of the access object service 309. The access object service 309 handles protocols and a content store manager. This means that files are segmented and the Lp tree is constructed by an access object 309. The FSRP 307 redirects file system accesses in a consistent way to the access objects 309 so that any in-memory state can be reused if a file is accessed repeatedly in a short time, and it avoids taking global locks.

Also included in this layer 306 are any number of nodes (e.g., Nodes 1 to 3, as shown), each containing a dedup/compression packer and a key-value (KV) store.

Distributed key value (KV) stores are also a component of Santorini and are used to hold much of the metadata such as the namespace Btree, the Lp tree, fingerprint index, and container fingerprints. These run as containers within the Santorini cluster and are stored to low latency media such as NVMe. There is also a distributed and durable log that replaces NVRAM for Santorini.

Capturing data is critical to helping understand how applications and infrastructure perform at any given time. This information is gathered from remote, often inaccessible points within a system, and the data can be voluminous and difficult to store over long periods because of capacity limitations. As telemetry becomes more important for distributed software products, the need increases for flexible telemetry architecture defined for storage systems, as current systems are simply not dynamic enough to add new metric data sets, data producers or consumers in storage systems during runtime.

Telemetry data is typically made up of logs, metrics, and traces. Logs provide an event-based record of notable activities across the system and can be formatted as structured, unstructured, or plain text that give the results of any transaction involving an endpoint in the system, but that may require log analysis tools for user review. Metrics are numerical data points represented as counts or measures often calculated or aggregated over time. Metrics originate from several sources including infrastructure, hosts, and third-party sources. Most metrics are accessible through query tools. Traces are generated by following a process from start to finish (e.g., an API request or other system activity).

It should be noted that telemetry data may capture activities that comprise normal system operation or anomalies or fault conditions. Most telemetry data generated in a normal running system typically comprises routine system data. Telemetry data can also include or flag problems or issues in the system. Alerts are one type of telemetry indicating a problematic situation has occurred. In some cases, the system may be able to automatically recover from this condition. Other times, an alert means that support needs to be engaged to address the situation.

In an embodiment, the telemetry data of interest generally comprises metrics that may be provided in alphanumeric form and comprises information about a running system. Telemetry data is data that is generated periodically through normal system operation and that should be stored and transferred to users/clients when needed or requested. Such data may include characteristics such as space usage, latency for function calls or APIs, user-initiated operations, internal process status, network traffic, component temperatures, and so on. The telemetry data may be generated through generic system processes or Santorini-specific processes, such as backup/restore operations, deduplication processes, replication functions, configuration updates, Garbage Collection (GC) processes, and so on.

Telemetry data may be ultimately provided to an end user or administrator for system analysis, debugging, or other desired purposes. The telemetry data may be generated by the pods as raw data which is then transformed into formatted records for storage in a backend database. This data may then be input to a front-end database for use by the user.

FIG. 4 is a table that lists some example telemetry data consumers and datasets, under some embodiments. For purposes of the present description, the term "consumer" generally means an entity, process, or component that uses telemetry data, such as listed in table 400, a "subscriber" is a consumer that has subscribed to use of telemetry data through a transport mechanism, and a "user" is an entity, such as a person, who accesses the telemetry data through a consumer, such as a GUI or other appropriate mechanism.

As shown in table 400, consumers may include storage users, GUIs, internal pods, and storage vendors, among other possible consumers. Various different telemetry data sets may be consumed by each consumer out of all of the telemetry data produced by the pods. For example, storage users may consume alerts, summary data, and security states of the pods for the purpose of generating periodic (e.g., daily or hourly) alert summaries to cover any asynchronous alerts that may have been generated but missed by any of the relevant components in the system. A GUI consumer may consume performance and topology telemetry data to display the relevant topology and performance details in real-time to any interested storage users. Internal pods may consume feature detail information to determined system performance for the purpose of adjusting resources (load balancing) and similar purposes. The storage vendor may consume license, capacity, and usage information to enforce system subscription and business/contract terms to make sure all users maintain fair usage of the storage system. FIG. 4 is provided primarily for purposes of illustration, and many other consumers, consumed data, and purposes are also possible.

Merging Streaming Telemetry Data

In some cases, the telemetry data may comprise streaming network telemetry, which is a real-time data collection service in which network devices, such as routers, switches and firewalls, continuously push data related to the network's health to a centralized location. Streaming telemetry is push-based, and data transmits automatically and continuously.

In streaming telemetry, every metric data stream is stored as a separate table maintained in a datastore. Different metric streams related to same resource create multiple in present systems, thus complicating the task of data extraction, as mentioned previously.

In an embodiment, cluster network 100 includes a dynamic telemetry process 112 that includes a table creation and merging process 115. Process 115 merges multiple streams from the telemetry producer for a specific data resource. Such a process can be implemented in the processor side of the telemetry collector.

To merge the multiple streams, epochs can be used to collate the data for a specific resource. As an epoch can differ for different data streams, the process can aggregate the data around time boundaries. A cache is created for each resource to hold the data in memory until all streams associated with that resource are present in the pipeline. For the same epoch for a specific resource, metric data can be collected and stored in a new table in the datastore. In this manner, the streaming telemetry data stored for a resource will have no duplicity and will lead to easier data extraction.

In addition, if a new stream is generated for a specific resource, such as for replication throttle, the cache based on the metric information (e.g., name) allows it to be added to the existing table for a particular replication context. When the data for this application (e.g., replication throttle) arrives in the telemetry pipeline, it can be integrated within the cache alongside the replication precompression and replication network data.

When the data having the new stream information is sent to the datastore, a new column will be automatically added to the existing table as per open telemetry (OTLP) processes.

The process can define a time limit parameter to limit the amount of time allowed for data to reach the cache. This can initially be determined by first considering the time taken for the data stream to arrive at the telemetry collector.

Figure 5:
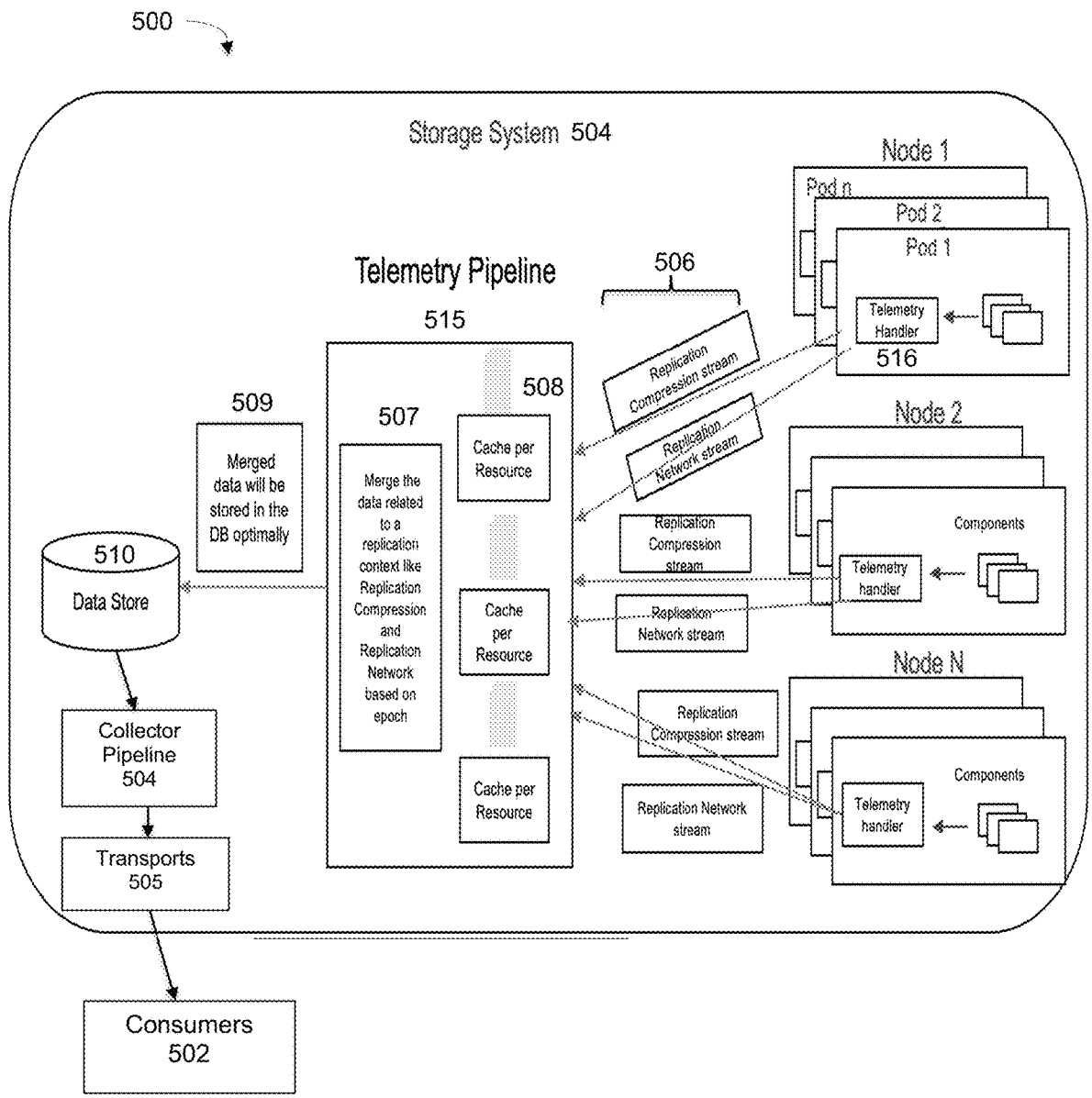
FIG. 5 illustrates a telemetry system for merging dataset tables in time-series, under some embodiments.

FIG. 5 illustrates a telemetry system for merging dataset tables in time-series, under some embodiments. As shown in FIG. 5, system 500 includes a containerized storage system 504 comprising a number of nodes (e.g., denoted Node 2, Node 3, Node 4, and so on), each having a number of pods (e.g., Pod 1 to n). Each pod has a number of components including a telemetry handler component 516 that sends telemetry data for storage in a datastore 510 and transmission to telemetry consumers. For the embodiment of FIG. 5, the telemetry data sent by the pods comprises streaming telemetry 506. Various types of streaming data can be sent depending on the system configuration and applications. For the example embodiment shown, the data streams comprise a replication compression stream and a replication network stream sent from each three pods. The types of data streams 506 are shown for purposes of example only, and any other data stream may also be used.

The data streams 515 are sent to the datastore 510 through a telemetry pipeline 515. The telemetry pipeline is configured to have a cache 508 for every resource, where a resource comprises a pod (or node) transmitting streaming data from a telemetry handler 516. Each such pod will maintain a cache 508 that temporarily stores the data streams generated by that pod.

The cached data streams from all of the caches are periodically merged through a merge process 507. The periodicity of the merge process is defined by an epoch, which is a measure of time during which data streams are collected from the caches for merging with each other. For the example of FIG. 5, the merge process 507 merges telemetry data related to a replication operation for the replication compression stream and replication network stream for each pod. Once merged, the telemetry data will be stored through process 509 in the datastore 510, such as in a database or other similar data element.

Once stored, the merged telemetry can be processed and transmitted from the storage system as needed. For the example of FIG. 5, the telemetry data is collected by a telemetry collector in a collector pipeline 504. It is then sent by a transport mechanism 505 out to one or more consumers. The transport mechanisms may comprise Webhook, SMTP, SNMP, or other similar mechanisms. The data consumers 502 can be GUIs, internal pods, storage vendor IT backend systems, or storage system users, among others. The streaming data from the data store 510 from the pods is collected through a collector pipeline through the respective telemetry handlers 516, and then transmitted through a selected transport mechanism 505 to the consumers.

In an embodiment, the collector pipeline 504 and telemetry pipeline may be embodied within the same pipeline infrastructure, or in different pipelines. In general, the pipeline or pipelines are implemented using Open Telemetry (OTEL) for a standard way of data collection. OTEL is generally understood to be an open source observability platform comprising a collection of tools, APIs and SDKs. OTEL enables users to instrument, generate, collect, and export telemetry data for further analysis. OTEL can provide a standard format dictating how data is collected and sent through unified sets of vendor-agnostic libraries and APIs. It removes the need to operate and maintain multiple agents/collectors.

Figure 6:
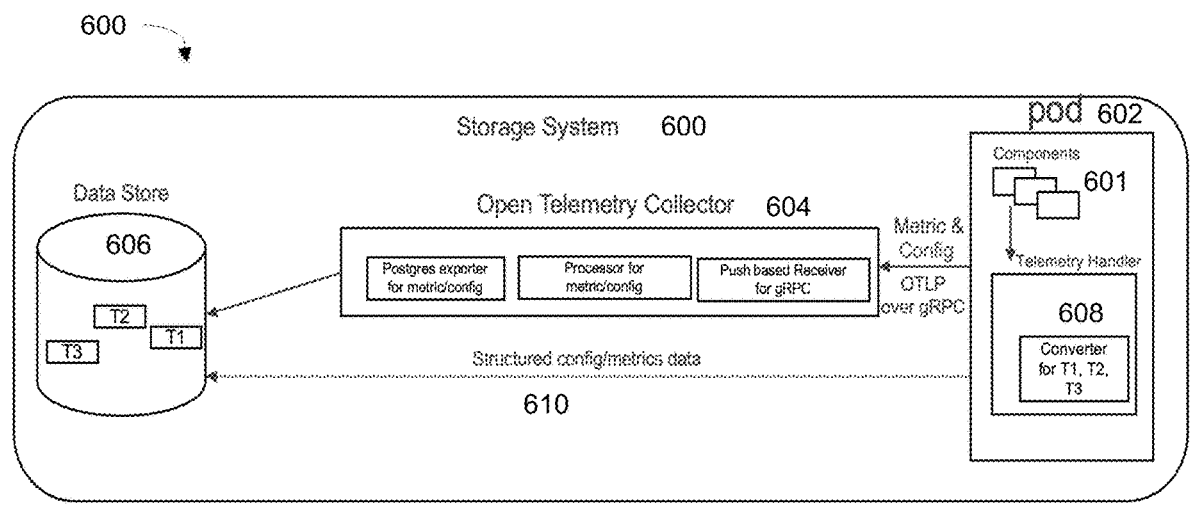
FIG. 6 illustrates a telemetry data pipeline, under some embodiments.

FIG. 6 illustrates a telemetry data pipeline, under some embodiments. In FIG. 6, storage system 600 comprises a pod 602 coupled to data store 606 through an open telemetry collector 604. The pod 602 contains certain components 601, such as disks, devices, and so on. These components all periodically generate telemetry data that is input to telemetry handler 608. The telemetry handler includes a converter to convert the telemetry datasets for the components, such as denoted T1, T2, T3, for the example of FIG. 6. The metric telemetry data is input from the pod 602 to the collector 604 over appropriate interfaces, such as OTLP (Open Telemetry protocol) gRPC (remote procedure call) interfaces, and the like. The collector includes a push-based receiver, a processor, and an exporter for the metric data. The datasets (T1, T2, T3) are then stored in data store 606. In an embodiment, the metric data can also be converted to structured data in the pod's telemetry handler 608 and sent for storage in data store 606 directly as the structured data 610.

Datasets are exposed to users through a variety of different interfaces (e.g., REST/CLI/GUI or notifications), and will be consistent at any time point as they are sent from the same data pool and pre-defined frequency.

Product vendors and other consumers, through their backend components can subscribe for new datasets from systems in the field dynamically. Datasets shared with vendor backends are structured, and OTEL-based data enables community tools to be leveraged for data analytics.

As shown in FIG. 5, process 507 merges the multiple streams of the producers into one stream for storage as a single table or database. FIGS. 7A, 7B, and 7C illustrate an example of a two tables merged to form a stored table, under an example embodiment. FIG. 7A illustrates information for a replication compression data stream in a time series database 702 with an epoch on the order of microseconds. The information comprises the epoch (ms), the hostname, the replication connection host (repl_conn_host), and the replication precompression data.

FIG. 7B illustrates information for a replication network information data stream in a time series database 704, also with an epoch on the order of microseconds. The information comprises the epoch (ms), the hostname, the replication connection host (repl_conn_host), and the replication network data.

These two tables 7A and 7B, are merged to create the time-series database 706. In this case, the epoch is on the order of seconds to capture both datasets of tables 702 and 704, which have different epochs in the micro-second scale. As shown in FIG. 7C, the merged time-series database 706, has the same host as both table 702 and 704, and database entries for each of the replication precompression data and the replication network data.

As shown in FIGS. 7A to 7C, there are two pieces of closely related information (replication precompression bytes and bytes transferred across the network) that are generated at nearly the same time. Instead of storing these in separate tables, they are merged into a single table 706 to represent the state of the system at that second in time. This reduces the number of tables, the size of the database overall, and simplifies analytics queries later that can query a single table instead of multiple tables.

It should be noted that the tables are provided for purposes of example only, and other datasets, network elements, and time epochs may also be used.

Figure 8:
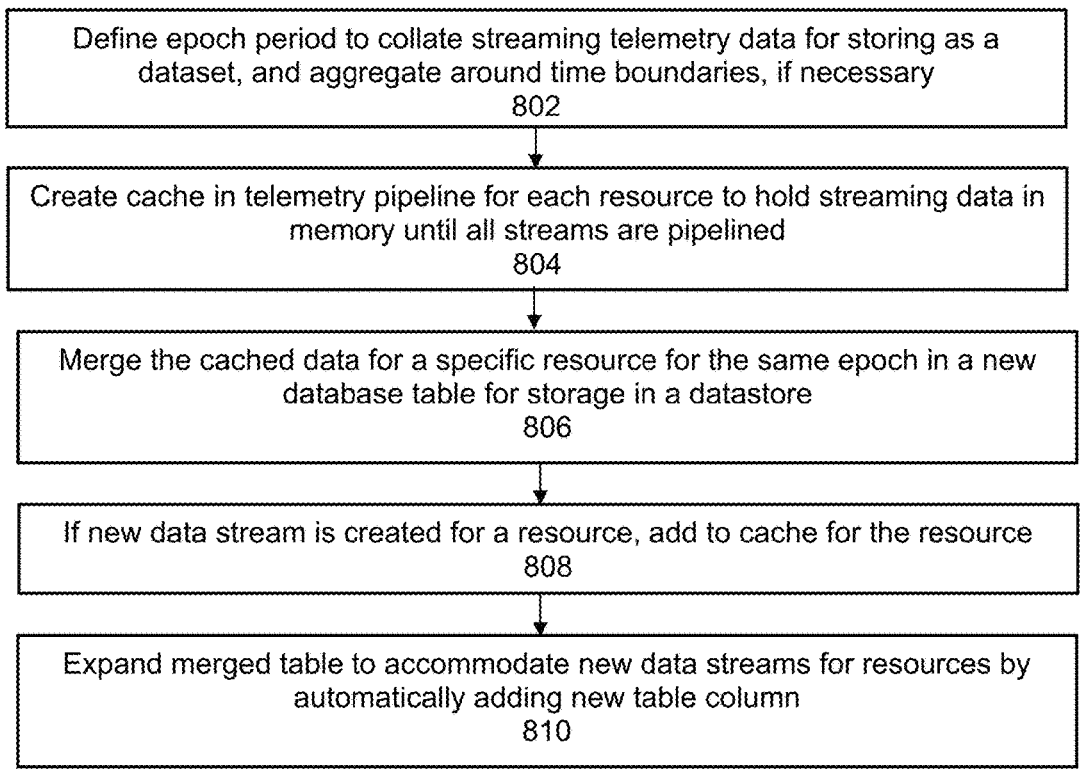
FIG. 8 is a flowchart illustrating a method of creating and merging streaming telemetry data, under some embodiments.

FIG. 8 is a flowchart illustrating a method of creating and merging streaming telemetry data, under some embodiments. The process of FIG. 8 begins with defining the epoch period to collate the streaming telemetry data for each resource for storing as a dataset, 802. The epoch periods are typically on the order of microseconds to full seconds or minutes, depending on the type of telemetry data produced. Epochs can differ for different data streams so the data can be aggregated around time boundaries, if necessary.

A cache is created in the telemetry pipeline for each resource to hold the data in memory until all streams associated with that resource are present in the pipeline, 804. the process then merges the cached data for a specific resource for the same epoch in a new database table for storage in a datastore, 806. If necessary, the epoch for the merged table may be modified to accommodate the individual cached data epochs, such as shown for the example of FIGS. 7A, 7B, and 7C.

If a new data stream is added for a resource, that data is stored in the cache created for that resource, 808. The merged table is then expanded to accommodate this new data stream by automatically adding a new table column to the database, 810.

In this manner, the merged database stores all of the streaming telemetry data for the different resources in a way that eliminates any duplicate data. This ultimately provides easier extraction of telemetry data from the database as search times are reduced due to more efficient data storage.

In an embodiment, system 500, provides certain processes that allow telemetry consumers and producers to make dynamic subscriptions (such as through process 166 of FIG. 2) to produce or consume different metric datasets 506 through one or more different transport mechanisms 505 for which they have subscribed. Such a subscription process utilizes a telemetry catalog is used to store the list of schemas of available metrics to which consumers can subscribe. Every dataset metric will be represented in the catalog using its schema. When new metrics get dynamically registered by any telemetry producer through a REST API, schema of these new metrics get updated to the catalog so that consumers get up-to-date catalog information for subscription.

As described above, in an embodiment, system 100 includes certain processes that may be implemented as a computer implemented software process, or as a hardware component, or both. As such, it may include executable modules executed by the one or more computers in the network, or embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 9:
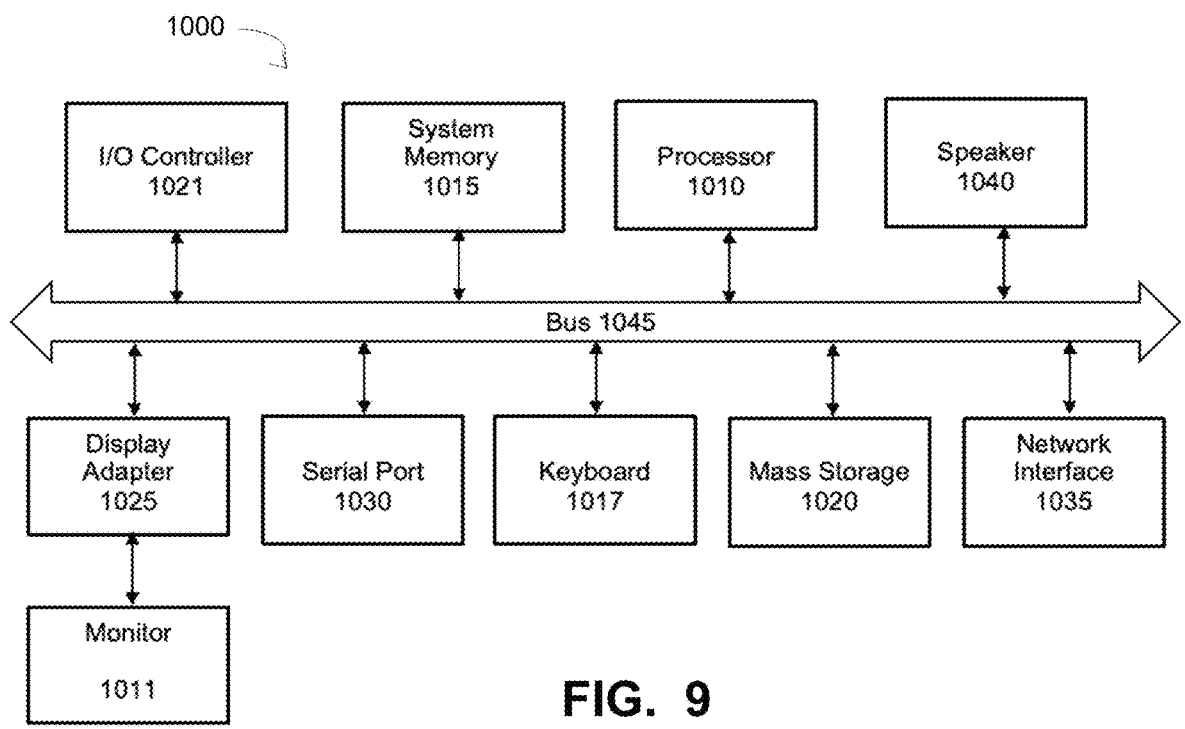
FIG. 9 is a block diagram of a computer system used to execute one or more software components of the processes described herein, under some embodiments.

FIG. 9 is a block diagram of a computer system used to execute one or more software components of the processes described herein, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules, or instantiated as distributed objects. The computer software products may also be component software. An operating system for the system may be one of the Microsoft Windows®. family of systems (e.g., Windows Server), Linux, Mac™ OS X, Unix, and so on.

Although certain embodiments have been described and illustrated with respect to certain example network topographies and node names and configurations, it should be understood that embodiments are not so limited, and any practical network topography is possible.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of processing streaming telemetry data in a cluster network having a plurality of pods, comprising:
   receiving streaming data from each pod constituting a resource of the network;
   defining an epoch to collate the streaming data for storing as a dataset in a database table;
   creating a cache in a telemetry pipeline for each resource to temporarily store the dataset for respective streaming data collated in an epoch; and
   merging cached data for a specific resource for the epoch in a merged database table.

2. The method of claim 1 further comprising:
   receiving a new data stream for a resource;
   storing the new data stream for the epoch in the cache for the resource; and
   automatically expanding the merged database table to add the new data stream stored in the cache.

3. The method of claim 1 further comprising defining one or more epoch periods for the epochs for each resource to aggregate the streaming data around appropriate time boundaries for the specific resource.

4. The method of claim 1 wherein the streaming telemetry data comprises data generated continuously by each pod upon operation in the cluster network, and consists of performance and health data of the network for transmission to one or more consumers comprising at least one of: storage users, graphical user interfaces (GUI), and storage vendors.

5. The method of claim 4 wherein the telemetry pipeline implements an Open Telemetry (OTEL) protocol, and comprises a collector receiving the telemetry data through a remote procedure call (RPC) process.

6. The method of claim 4 wherein a database table is created for each data stream captured during the epoch, and wherein the merged database table is created by combining the tables for each data stream for the epoch.

7. The method of claim 6 wherein the pods perform data protection operations comprising at least one of a data backup, data restore, data migration, and data replication for a deduplicated backup server using the cluster network.

8. The method of claim 7 wherein the resource comprises pods performing data protection tasks.

9. A method of improving extraction of telemetry data from a cluster network having a plurality of pods, comprising:
   collating streaming telemetry data received from each pod as a resource of the network, wherein a defined epoch delineates the streaming data into a plurality of metric datasets;
   storing each metric dataset as a database table created for the epoch in a respective cache created in a telemetry pipeline for each resource; and
   merging cached data for a specific resource for the epoch in a merged database table that combines metric datasets per epoch to remove duplicative information created by the plurality of metric datasets and facilitating more efficient searching and extraction of the streaming telemetry data.

10. The method of claim 9 further comprising:
    receiving a new data stream for a resource;
    storing the new data stream for the epoch in the cache for the resource; and
    automatically expanding the merged database table to add the new data stream stored in the cache.

11. The method of claim 9 further comprising defining one or more epochs to aggregate the streaming data around appropriate time boundaries for each resource.

12. The method of claim 9 wherein the streaming telemetry data comprises data generated continuously by each pod upon operation in the cluster network, and consists of performance and health data of the network for transmission to one or more consumers comprising at least one of: storage users, graphical user interfaces (GUI), and storage vendors.

13. The method of claim 12 wherein the telemetry pipeline implements an Open Telemetry (OTEL) protocol, and comprises a collector receiving the telemetry data through a remote procedure call (RPC) process.

14. The method of claim 13 wherein the pods perform data protection operations comprising at least one of data backups, data restore, data migration, and data replication for a deduplicated backup server using the cluster network.

15. The method of claim 14 wherein the resource comprises pods performing data replication tasks, and wherein the streaming data comprises data streams for replication pre-compression and replication network.

16. A system processing for improving extraction of telemetry data from a cluster network having a plurality of pods, the system comprising:
   a telemetry pipeline receiving streaming data from each pod and constituting a resource of the network;
   a processing component defining an epoch to collate the streaming data for storing as a dataset in a database table;
   a plurality of caches created in the telemetry pipeline, with one cache for created for each resource to temporarily store the dataset for respective streaming data collated in an epoch; and
   a merging component in the telemetry pipeline merging cached data for a specific resource for the epoch in a merged database table.

17. The system of claim 16 wherein the merging component combines metric datasets per epoch to remove duplicative information created by the plurality of metric datasets and facilitating more efficient searching and extraction of the streaming telemetry data.

18. The system of claim 17 wherein the streaming telemetry data comprises data generated continuously by each pod upon operation in the cluster network, and consists of performance and health data of the network for transmission to one or more consumers comprising at least one of: storage users, graphical user interfaces (GUI), and storage vendors, and wherein the telemetry pipeline implements an Open Telemetry (OTEL) protocol, and comprises a collector receiving the telemetry data through a remote procedure call (RPC) process.

19. The system of claim 18 wherein the cluster network processes containerized data, and further wherein the pods perform data protection operations comprising at least one of data backups, data restore, data migration, and data replication for a deduplicated backup server using the cluster network, and further wherein the resource comprises pods performing data replication tasks, and wherein the streaming data comprises data streams for replication pre-compression and replication network.

* * * * *